United States Patent
Terpstra et al.

(10) Patent No.: US 7,611,627 B2
(45) Date of Patent: Nov. 3, 2009

(54) MEMBRANE MODULE AS WELL AS A METHOD FOR MAKING A MEMBRANE MODULE

(76) Inventors: Rinse Alle Terpstra, Schaarland 11, NL-5663 JR, Geldrop (NL); Ruud Wilhelmus Johannes Dirrix, Heezerweg 83, NL-5614 HB, Geldrop (NL); Sander Johannes Everstein, Tsarenhof 71, NL-2402 DR, Alphen aan den Rijn (NL)

(*) Notice: Subject to any disclaimer, the term of this patent is extended or adjusted under 35 U.S.C. 154(b) by 310 days.

(21) Appl. No.: 11/656,710

(22) Filed: Jan. 23, 2007

(65) Prior Publication Data

US 2007/0193942 A1    Aug. 23, 2007

(51) Int. Cl.
*B01D 63/00* (2006.01)
*B01D 39/14* (2006.01)

(52) U.S. Cl. .............................. 210/321.8; 210/321.87; 210/321.88; 210/321.6; 210/500.23; 96/4; 96/10

(58) Field of Classification Search ............ 210/500.23, 210/500.25, 500.26, 321.78, 321.8, 321.87, 210/321.88, 321.89, 321.9; 96/4–10; 264/DIG. 48
See application file for complete search history.

(56) References Cited

U.S. PATENT DOCUMENTS

| 4,207,192 A | * | 6/1980 | Coplan et al. | ........... 210/321.88 |
| 4,220,535 A | * | 9/1980 | Leonard | ................. 210/321.89 |
| 4,310,607 A | * | 1/1982 | Shay | ........................... 429/104 |
| 6,887,304 B2 | * | 5/2005 | Stroh et al. | ....................... 96/8 |

FOREIGN PATENT DOCUMENTS

| EP | 0941759 | 9/1999 |
| EP | 1547671 | 6/2005 |
| WO | WO 0276591 | 3/2002 |
| WO | WO 2004014530 | 2/2004 |
| WO | WO 2004103532 | 12/2004 |

* cited by examiner

*Primary Examiner*—Ana M Fortuna

(57) ABSTRACT

The membrane module according to the invention is characterized in that it has concrete flanges. This membrane module is made by first sealing a bundle of ceramic fiber membranes at one end using a viscous sealant and then pressing it into a fluid mass of concrete in a mould. After the mass of concrete has hardened the process is repeated with the other end of the bundle. Finally the ends of the fiber membranes are opened by sawing off a slice of the flanges.

4 Claims, 4 Drawing Sheets

MEMBRANE MODULE AS WELL AS A METHOD FOR MAKING A MEMBRANE MODULE

BACKGROUND OF THE INVENTION

1. Field of the invention

The invention relates to a membrane module comprising a bundle of ceramic hollow fibre membranes with a ceramic flange on at least one end. Membrane modules with ceramic hollow fibre membranes are for instance being employed in separation and concentration processes for separating and concentrating gasses and liquids. Because the surface/volume ratio is relatively great, the efficiency of the concentration and separation processes is high. There is nearly always a flange on both ends of the fibre membranes.

2. Prior art

Such a membrane module is known from the European patent application EP 0 941 759 A. The flanges here are made of a sintered ceramic paste. The sintering process is relatively expensive and complex as a result of which a membrane module made this way is also relatively expensive.

SUMMARY OF THE INVENTION

An objective of the invention is to provide a membrane module of the type described in the preamble which can be produced less expensively and more simply than the known membrane module. For this purpose, the membrane module according to the invention is characterized in that the flange is made of concrete. Concrete is a ceramic material that is easy to work with and is inexpensive. With flanges made of concrete, the membrane module is suitable for applications at high temperatures, is highly resistant to chemicals and is strong mechanically, as a result of which the range of applications and the useful life of the membrane module according to the invention is high.

As to the concrete, in principle, any concrete available on the market is suitable for use here. The flange is preferably made of refractory concrete. Because of this, applications at even higher temperatures are possible.

An embodiment of the membrane module according to the invention is characterized in that the flange is covered with a gastight coating, preferably a ceramic or glaze coating.

The invention also relates to a method for making a membrane module according to the invention, which membrane module is built up of a bundle of ceramic hollow fibre membranes with a flange on at least one end. Such a method is also known from the European patent application EP 0 941 759 A.

With respect to the method, the invention is characterized in that first the fibre membranes are sealed on at least one end, then a concrete flange is made in a mould about the fibre membrane's sealed ends after which one must wait until the concrete has hardened, and finally the ends of the fibre membranes are opened.

To make the flange, preferably fluid concrete is poured first into a mould and then the bundle of fibre membranes is placed on one end in the fluid concrete. Clay or epoxy, for example, can be used as a sealant. The flange material (concrete) can also be used as a sealant. Usually after the concrete has hardened, a second flange is made on the other end of the bundle of fibre membranes in the same way.

In order to see that the space between the fibre membranes is well-filled with concrete, which is necessary for the membrane module to function well, another embodiment of the method according to the invention is characterized in that the fibre membranes are kept at a distance from each other when placing them in the mould. This can be done, for example, by inserting the fibre membranes in a plate with holes, where the plate is held at a distance from the ends of the fibre membranes so that it does not come into the concrete.

In order to prevent water from being absorbed from the concrete by the fibre membranes as a result of which the concrete might be of less quality, a further embodiment of the method according to the invention is characterized in that the fibre membranes, before their ends are brought into contact with the concrete, are placed in a liquid, preferably water, for a period of time.

The requirements for dimensional and form accuracy of membrane modules are high. In order to obtain membrane modules having a high degree of precision, still a further embodiment of the method according to the invention is characterized in that before the bundle of fibre membranes is placed in the mould, it is first put into a tube, after which this tube is put in the tight-fitting mould, the wall of which is perpendicular to the bottom. In this way, it is assured that the fibre membranes will be perpendicular to the flange and the membrane module thus will have a high degree of form accuracy.

A further embodiment of the method according to the invention is characterized in that the concrete flange is kept under water while it is hardening and after that it is dried.

Still a further embodiment of the method according to the invention is characterized in that after hardening, the flange's ends and the fibre membranes are sawed off, in order to open the fibre membranes at the ends and to cut them off to the correct length, after which the membrane module is heated to at least 1000° C., preferably 1200-1400° C.

Again a further embodiment of the method according to the invention is characterized in that while the concrete is hardening, the mould along with the fibre membranes in the concrete is vibrated. Because of this, the space between the fibre membranes can be filled even better with concrete. Furthermore, a catalyst for accelerating the process of hardening is preferably added to the concrete and/or the temperature is increased while hardening.

Preferably, after making the membrane module, a gastight coating, for example a coating of glaze is applied to at least the flange in order to make it gastight. Furthermore, before glazing takes place, the membrane module is preferably subjected to a heat treatment process in order to make the membrane module stress-free.

Furthermore, after the membrane module has been made, preferably, the fibre membranes are coated.

BRIEF DESCRIPTION OF THE DRAWINGS

The invention will be elucidated more fully below on the basis of drawings in which an embodiment of the method according to the invention is shown. In these drawings.

DETAILED DESCRIPTION OF THE DRAWINGS

Figure 1:
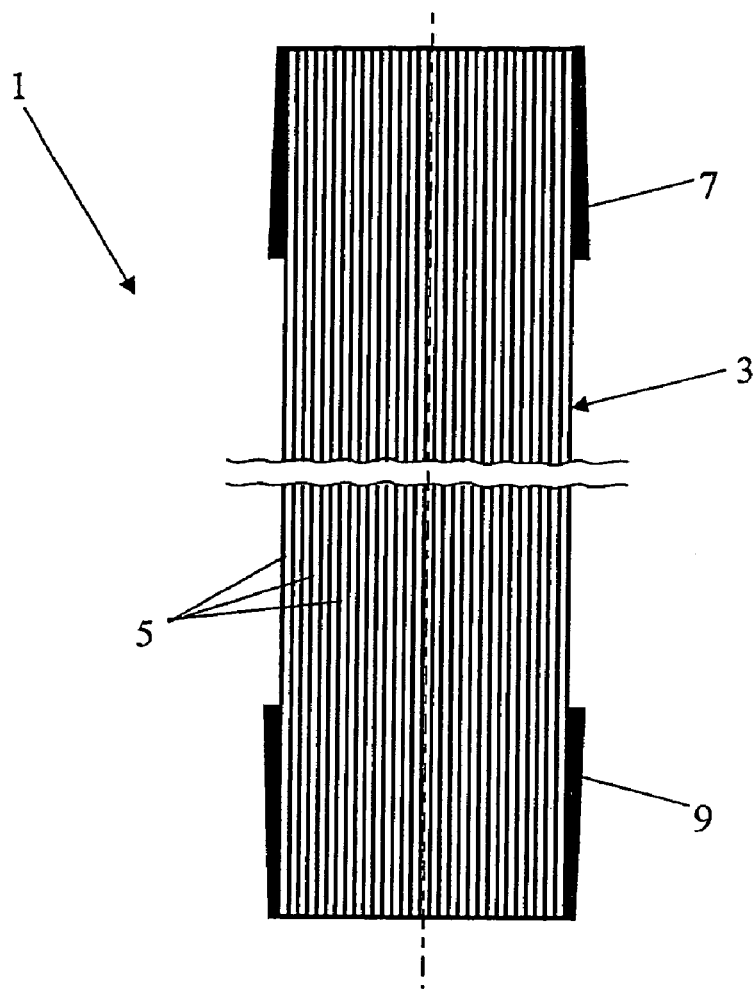
FIG. 1 shows a side view of a membrane module made in accordance with the method according to the invention.
Figure 2:
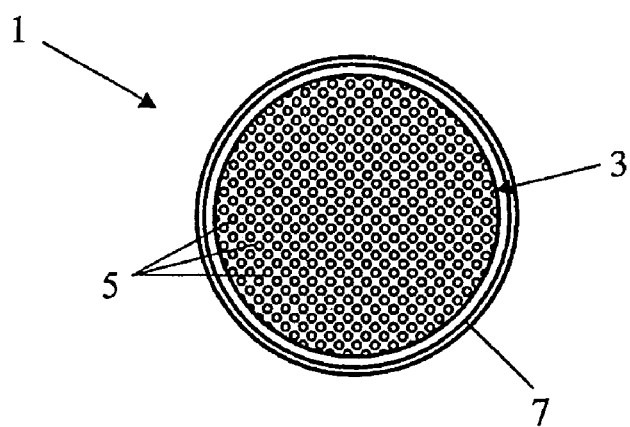
FIG. 2 shows a view from above of the membrane module.

In FIGS. 1 and 2 a membrane module 1 made up of a bundle 3 of ceramic hollow fibre membranes 5 with a flange 7, 9 of refractory concrete at each end is shown in a side view and a view from above. Regarding the concrete, refractory concrete Flucon 180 TFF manufactured by the firm Gouda Vuurvast, Goudkade 16, 2802 AA Gouda, the Netherlands, for example, may be used. The fibre membranes may or may not be coated and the flange may or may not be sealed with a ceramic or glaze coating. Based on the following description referring to FIGS. 3 through 6 inclusive, an embodiment of the method according to the invention for. making such a membrane module will be described.

Figure 3:
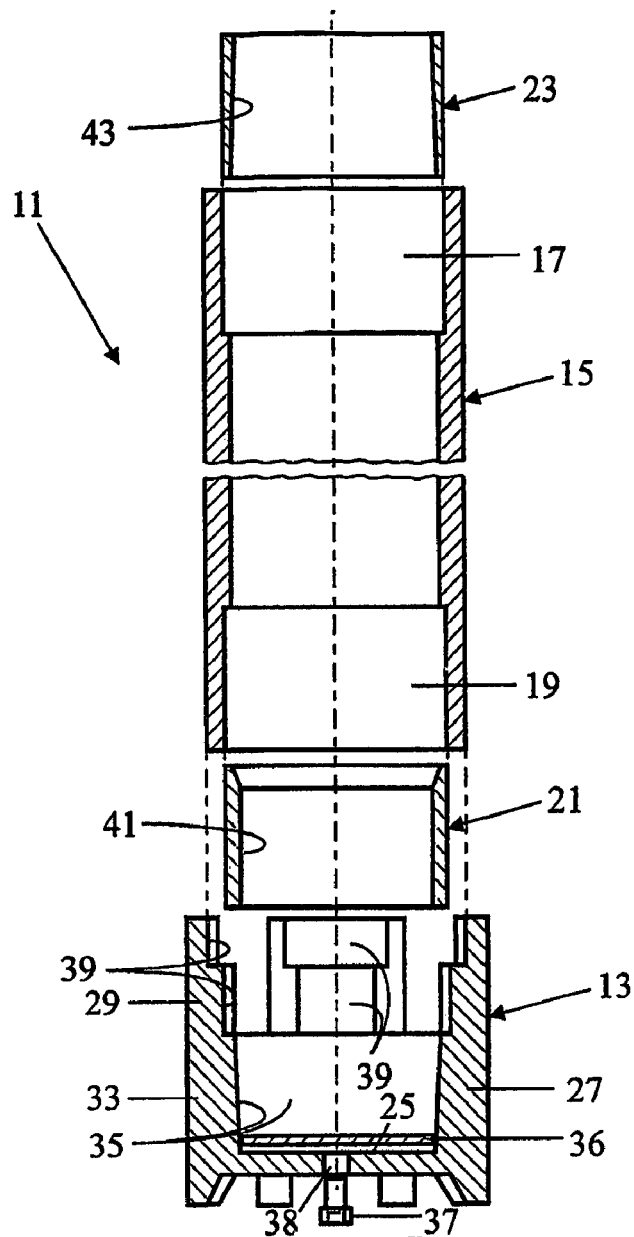
FIG. 3 shows a device for making a membrane module displaying the parts when taken apart.
Figure 4:
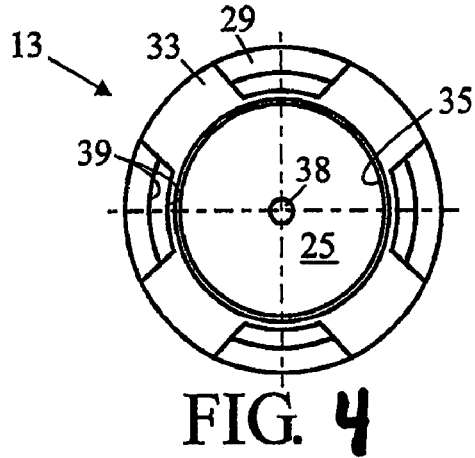
FIG. 4 shows a view from above of the device's mould.
Figure 5:
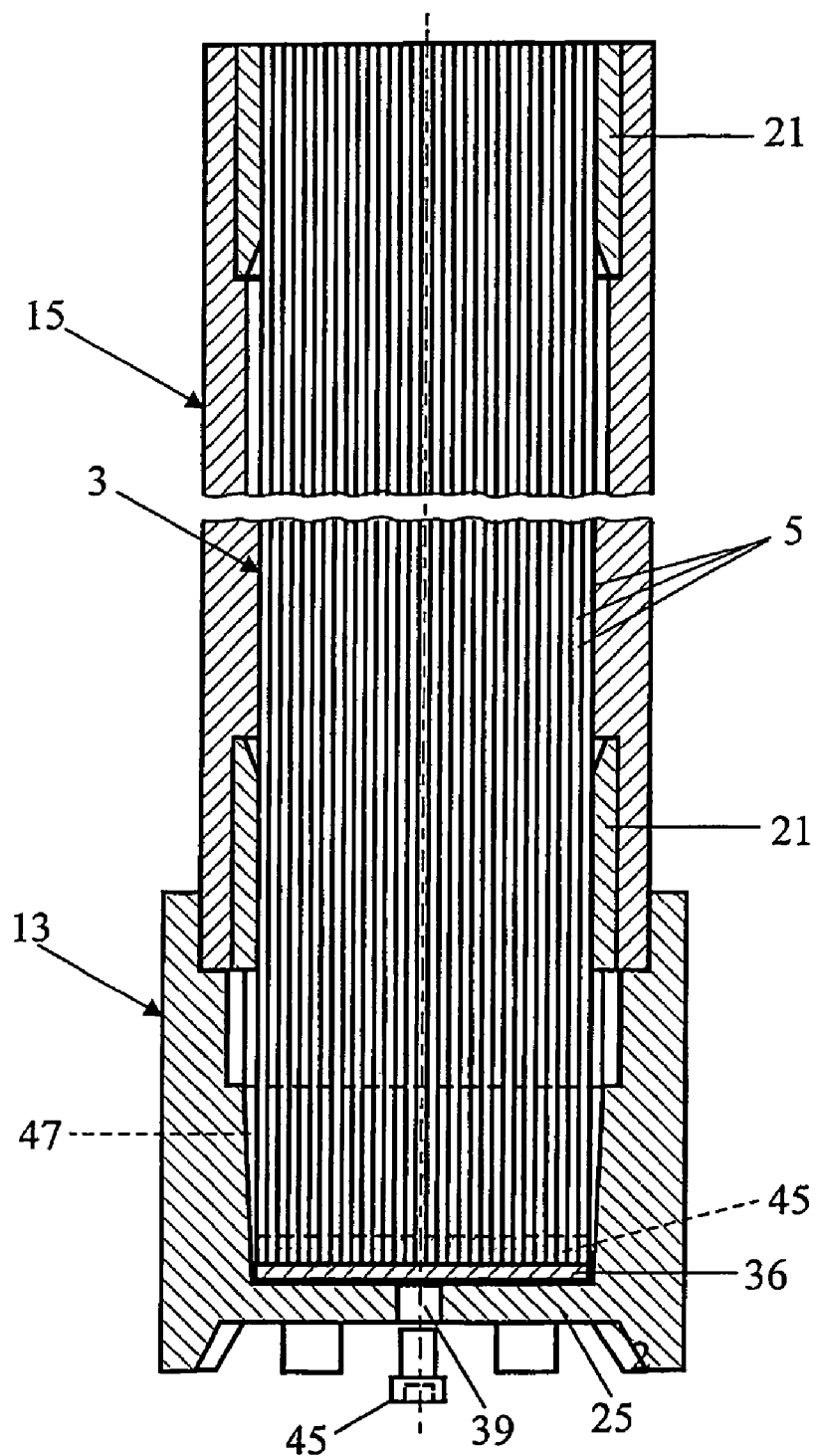
FIG. 5 shows the device with the fibre membranes placed in it during the first step of the method.

In FIG. 3 a device 11 is shown for making the membrane module, in which the individual parts have been taken apart. In FIG. 4 the lower part, the mould 13 is shown in a view from above for the sake of clarity. The device 11 consists of a mould 13 and a tube 15 which can be slid into the tight-fitting mould. At the tube's ends 17, 19, the inside diameter has been increased along a distance in order to be able to place the rings 21 or ring 23 in it.

The mould 13 has a bottom 25 and a wall 27 and is made, for example, of polypropylene, Teflon, aluminum coated with Teflon or any other material with which the casting material used to make the flanges does not interact or adhere to. The lower part 33 of the wall 27 is slightly conical on the inside 35 in order to facilitate removal of the flange to be made in it. In order to facilitate further the removal of the flange from the mould, a small plate 36 is placed on the bottom 25 of the mould 13 and after hardening has taken place, the plate is pushed away by screwing a bolt 37 through a hole 38 provided with a thread in the bottom 25.

The inside 39 of the wall's upper part 29 is stepped, in which the inside diameter of the upper step is the same as or slightly greater than the outside diameter of the tube 15.

The inner wall 41 of the rings 21 is conical at one end and the inner wall 43 of the ring 23 is conical and has the same shape as the inner wall 35 of the lower part 33 of the wall 27 of the mould 13. The tube 15, the rings 21. and the ring 23 are preferably made of the same material as that of the mould 13.

First of all, the ends of the ceramic fibre membranes 5 that have already been fired are placed in water for a period of time so that after that they will not absorb water from the fluid mass of concrete, as a result of which the quality of the concrete will not be reduced.

Next the ends of the fibre membranes 5 are sealed with a viscous sealant, for example, clay or epoxy, and the fluid concrete 47 (400 grammes of concrete powder mixed with 32 ml of water) is poured into the mould 13. The small plate 38 is placed in the mould 13 before the concrete is poured.

In order to see that the flange will be perpendicular to the fibre membranes, the fibre membranes 5 are first retained in the rings 21. The rings 21 are placed in the tube 15 beforehand which is slid into the tight-fitting mould 13, while the bundle of fibre membranes 5 is pushed into the fluid concrete 47.

The concrete 47 is then allowed to harden. While hardening, the concrete is preferably kept under water for 24 hours. If necessary, hardening can be accelerated by vibrating the whole unit and/or adding catalysts to the concrete. After that the bolt 37 is screwed in the hole 38, as a result of which the small plate 36 pushes the flange that has just been made of the mould 13. The tube 15 with the rings 21 is then slid off of the bundle 3 of fibre membranes and the rings 21 are removed from the tube 15. The flange is then dried at room temperature or, if necessary, at an increased temperature of approximately 60° C.

Figure 6:
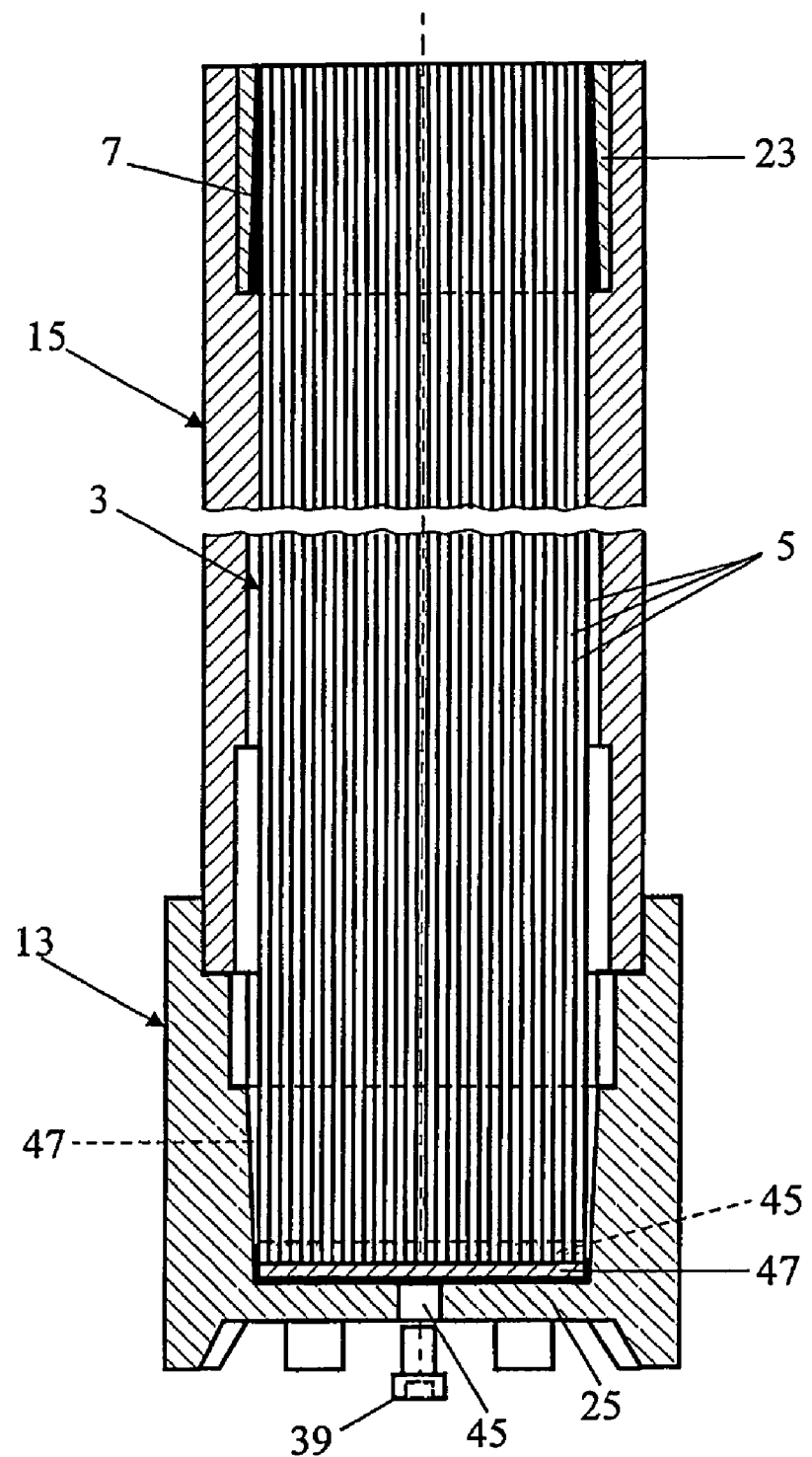
FIG. 6 shows the device during the second step of the method.

Then the ring 23 is slid into one end of the tube 15 and the bundle 3 of fibre membranes is slid into the tube again while the flange 7 that has been made is clamped by an additional ring 23, see FIG. 6. The other flange is now made in the same way as described above and the tube 15 with the ring 23 is slid off of the bundle 3 of fibre membranes.

After this, the ends of the fibre membranes 5 are opened by sawing off the end 45 of the flange with the sealed ends of the fibre membranes in it. After the membrane module has been made, it is subjected to a heat treatment process in order to strengthen the membrane module as well as make it stress-free and shrink-resistant. For this, the membrane module is heated up during a period of approximately 22 hours 2 hours of which to a maximum temperature of 1200 to 1400° C. Finally, a ceramic or glaze coating is applied to the flanges in order to make them gastight and a coating may also be applied to the fibre membranes.

Although in the above the invention is explained on the basis of the drawings, it should be noted that the invention is in no way limited to the embodiments shown in the drawings. The invention also extends to all embodiments deviating from the embodiments shown in the drawings within the context defined by the claims. Thus, for example, the rings mentioned may be replaced by discs which are provided with holes through which the fibre membranes can be placed in order to keep the fibre membranes mutually at a distance from each other as a result of which the fluid concrete can come in between them better.

What is claimed is:

1. Membrane module comprising a bundle of ceramic hollow fibre membranes with a ceramic flange on at least one end, characterized in that the flange is made of concrete.

2. Membrane module according to claim 1, characterized in that the flange is made of refractory concrete.

3. Membrane module according to claim 1, characterized in that the flange is covered with a gastight coating.

4. Membrane module according to claim 3, characterized in that the gastight coating is a ceramic or glaze coating.

* * * * *